United States Patent [19]

Gardner

[11] Patent Number: 5,632,493

[45] Date of Patent: May 27, 1997

[54] COMPLIANT PRESSURE BALANCED SEAL APPARATUS

[75] Inventor: James F. Gardner, Exeter, R.I.

[73] Assignee: EG&G Sealol, Inc., Cranston, R.I.

[21] Appl. No.: 434,543

[22] Filed: May 4, 1995

[51] Int. Cl.⁶ .................................................. F16J 15/447
[52] U.S. Cl. .................... 277/27; 277/53; 277/174; 277/192
[58] Field of Search .................... 277/3, 27, 53, 277/57, 148, 152, 173, 174, 192, 199, 212 F, 236; 432/115

[56] References Cited

U.S. PATENT DOCUMENTS

| | | | |
|---|---|---|---|
| 4,042,248 | 8/1977 | Williamitis | 277/152 |
| 4,405,137 | 9/1983 | Webb | 277/148 |
| 4,427,205 | 1/1984 | Holzer et al. | 277/152 |
| 5,078,412 | 1/1992 | Baumgarth | 277/236 |
| 5,099,886 | 3/1992 | Squirrell | 277/236 |
| 5,100,158 | 3/1992 | Gardner | 277/27 |
| 5,370,402 | 12/1994 | Gardner et al. | 277/53 |
| 5,524,846 | 6/1996 | Shine et al. | 277/148 |

FOREIGN PATENT DOCUMENTS 0 62 9798  12/1994  European Pat. Off. .
629799    12/1994  European Pat. Off. ............. 277/53

OTHER PUBLICATIONS

J. Gardner et al., "A New Compliant Seal Concept for Aerospace Applications," presented and published in the proceedings of the Fourth International Symposium on Transport Phenomena and Dynamics of Rotating Machinery (ISROMAC-4), Apr. 5–8, 1992, Honolulu, Hawaii, pp. 593–612.

*Primary Examiner*—William A. Cuchlinski, Jr.
*Assistant Examiner*—John L. Beres
*Attorney, Agent, or Firm*—Finnegan, Henderson, Farabow, Garrett & Dunner, L.L.P.

[57] ABSTRACT

A compliant seal apparatus for sealing a high pressure area from a low pressure area. The compliant seal device comprises a housing including a first wall positioned proximate the high pressure area, and a second wall positioned proximate the low pressure area. A cavity is formed between an inner surface of the first wall and an inner surface of the second wall. A finger having a free end extends from proximate the first wall toward the low pressure area. A member extends from an upper surface of the finger into the cavity to form a sealing engagement with the second wall inner surface. This sealing engagement is located closer than the free end of the finger to the first wall inner surface.

52 Claims, 9 Drawing Sheets

COMPLIANT PRESSURE BALANCED SEAL APPARATUS

BACKGROUND OF THE INVENTION

1. Field of the Invention

The present invention relates to a gas or liquid seal and, more specifically, to a compliant seal for sealing high pressure areas from low pressure areas.

2. Description of the Related Art

Many different types of machinery use clearance seals to contain a gas or other fluid under pressure. However, varying conditions during machine operation present many difficulties when designing these clearance seals. For example, when a machinery shaft rotates it may undergo a slight centrifugal growth at high rotational speeds. In addition, during rotation these shafts may undergo radial excursions caused by extreme speed changes, temperature fluctuations, non-concentric alignment, shaft runout, or other factors. Thus, a clearance seal between a rotating machine shaft and casing must adapt to these dynamic conditions.

Typical clearance seals include simple labyrinth seals which break down pressure by using a series of teeth or blades in close proximity to a rotating shaft. Such devices are well known and reliable, but allow high rates of gas leakage. Typically, clearances between the blade tips of a labyrinth seal and the shaft are as high as 0.001–0.002 inches per inch of shaft diameter.

Much work has been done to reduce the leakage of labyrinth seals. Typically, the approach of past efforts has been directed toward improved blade geometry (e.g., backward angled blade designs), step seals, or interlocking blade designs to reduce losses. Abradable labyrinth seal designs have also been developed and are employed, particularly, on jet engines. The blades of such abradable seals are initially installed with a line-to-line clearance, and then wear in to their own clearance as the machine rotates. However, after the rotor has gone through an operating history of radial vibration combined with axial excursions, a crescent-shaped clearance is often cut into the abradable seal, and leakage can increase dramatically. In spite of many improved designs, therefore, leakage losses for labyrinth seals continue to represent a considerable energy loss in rotating machinery.

Another significant problem with high pressure labyrinth seals is the occurrence of rotordynamic effects. Since high pressure gas is quite dense, a labyrinth seal begins to act as a bearing with high gas pressures, but tends to destabilize the rotor due to a lack of concentricity with the actual machine bearings. Significant effort has been made recently to decrease rotordynamic excitation effects. The product of these efforts includes swirl breaks in front of a labyrinth, reverse swirl inducers, and injecting tangentially non-moving gas into the first stagnant region of the labyrinth. Other work has been concentrated on optimized geometry and creating a rough surface within the labyrinth seal to retard circumferential gas velocity buildup. Also, honeycomb design labyrinth seals have been developed to reduce rotordynamic excitation effects. However, further reduction of rotordynamic effects is needed.

As an alternative to the labyrinth seal, applicant has proposed a seal having flexible elements which ride upon a thin gas or liquid film between the fingers and a rotating shaft. Such compliant seals are disclosed in U.S. Pat. No. 5,100,158 and U.S. Pat. No. 5,370,402, the disclosures of which are incorporated by reference.

SUMMARY OF THE INVENTION

Features and advantages of the invention will be set forth in part in the description which follows, and in part will be obvious from the description, or may be learned by practice of the invention. The objects and other advantages of the invention may be realized and attained by the apparatus particularly pointed out in the written description, claims and appended drawings.

To achieve these and other advantages, and in accordance with the purposes of the invention as embodied and broadly described herein, a compliant seal apparatus for sealing a high pressure area from a low pressure area is provided comprising a housing including a first wall positioned proximate the high pressure area and a second wall positioned proximate the low pressure area. The first and second walls are positioned adjacent each other with facing inner surfaces of the walls defining, at least in part, a cavity therebetween. At least one finger extends from proximate the first wall toward the low pressure area, the finger includes a free end. A member extends from an upper surface of the finger into the cavity to form a sealing engagement with the second wall inner surface, the sealing engagement being located closer than the free end to the first wall inner surface.

In one aspect of the invention, the finger includes a flexible bridge portion coupled to the first wall and a tip portion adjacent the bridge portion, the tip portion having the free end of the finger.

In another aspect of the invention, a compliant sealing apparatus is provided comprising a housing, a first flexible sheet member, and a second sheet member.

In a further aspect of the invention, a device having a high pressure and low pressure area is provided comprising a rotatable shaft and a compliant sealing apparatus.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate several embodiments of the invention and together with the description serve to explain the principles of the invention. In the drawings.

DETAILED DESCRIPTION OF THE INVENTION

Reference will now be made in detail to the presently preferred embodiments of the invention, as illustrated in the accompanying drawings, in which like reference characters designate like or corresponding parts throughout the several drawings.

Figure 1:
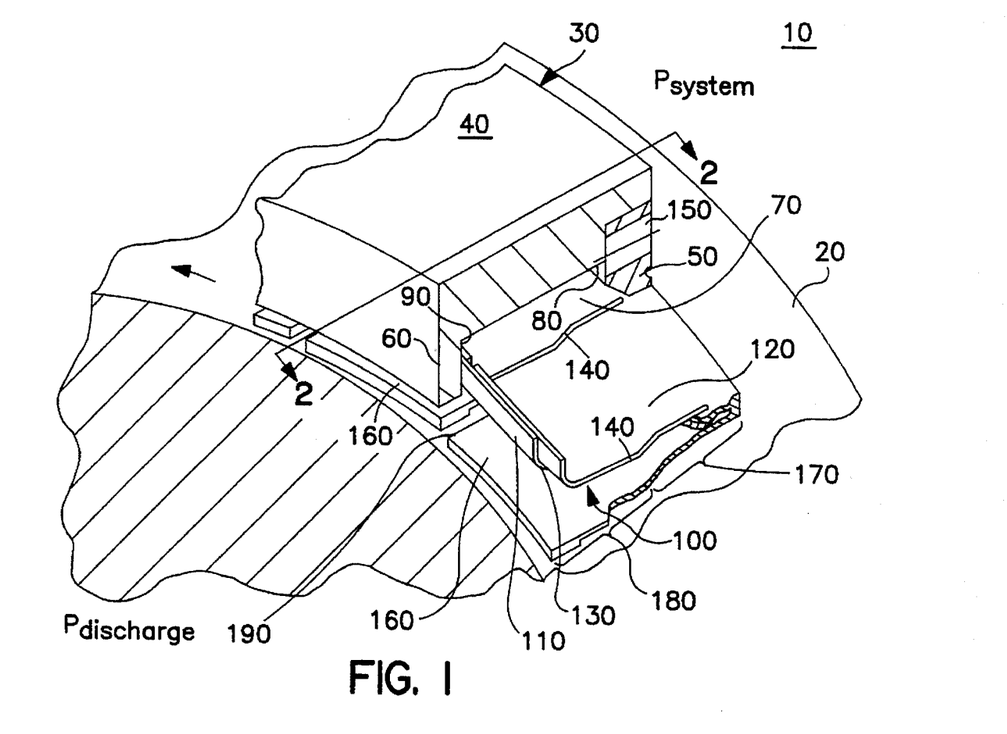
FIG. 1 is a perspective view of a compliant seal apparatus and a rotatable shaft in accordance with a first embodiment of the invention.
Figure 2:
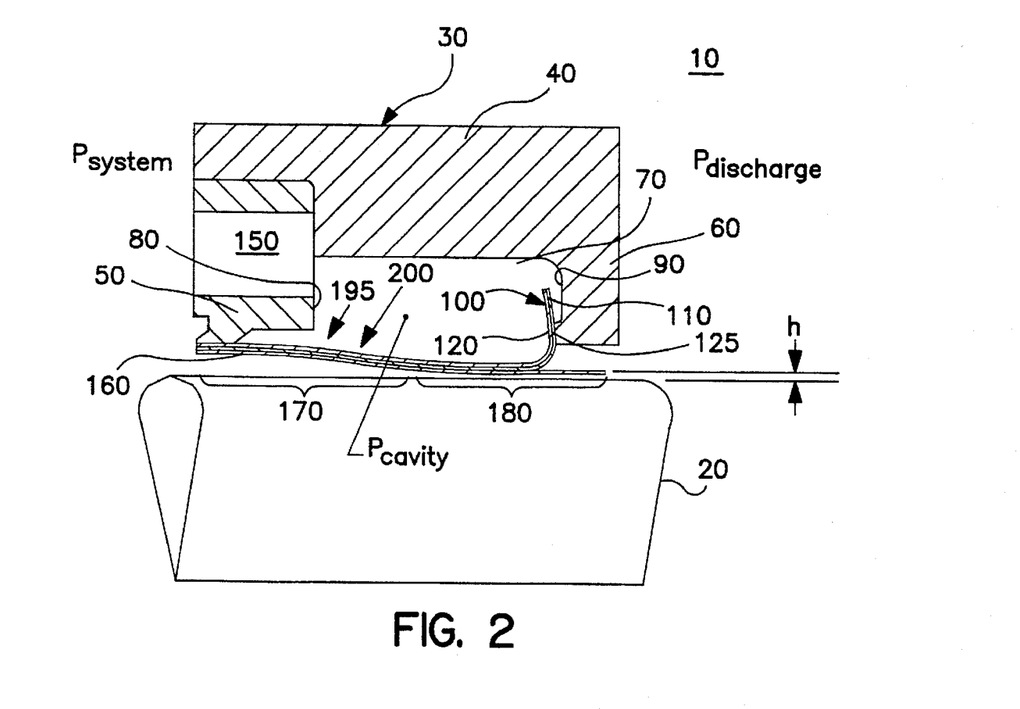
FIG. 2 is a cross-section on line 2—2 of FIG. 1.

A first embodiment of the invention will now be described with reference to FIGS. 1, 2 and 3. As shown in FIGS. 1 and 2, a compliant seal apparatus 10 is provided for inhibiting the flow of a fluid in a stream along a rotatable shaft 20. The fluid is sealed, for example, within a machine casing (not shown) and has a system pressure of Psystem. The area outside of the sealed machine casing toward which the sealed gas will tend to leak has a discharge pressure Pdischarge, the system pressure Psystem being greater than the discharge pressure Pdischarge.

The compliant seal apparatus 10 comprises annular housing 30 including an annular base wall 40, a first wall 50 extending radially inward from the base wall 40 proximate the system pressure Psystem, and a second wall 60 extending radially inward from the base wall 40 proximate the discharge pressure Pdischarge. The housing 30 further includes an annular cavity 70 formed within a first wall inner surface 80, a second wall inner surface 90 and the base wall 40. The housing 30 is removably attached to the machine casing (not shown), as is known to one skilled in the art.

Preferably, the housing 30 is fabricated from a weldable material having a high yield strength at high temperatures. For example, the housing 30 can comprise a nickel based alloy such as Inconel® 718 manufactured by Inco Alloys International. It should be understood that the composition of the housing 30 can be varied depending on the particular application for which the compliant seal apparatus 10 is to be used.

The compliant seal apparatus 10 further comprises a plurality of members 100 extending into the cavity 70 for forming a sealing engagement with the second wall inner surface 90. As shown in FIGS. 1, 2 and 3, each of the members 100 includes a plurality of first flexible sheet members 110 and a plurality of second flexible sheet members 120 located between the first flexible sheet members 110 and the cavity 70. Each of the first and second sheet members 110, 120 extend between the first wall 50 and the second wall 60 of the housing 30. These sheet members 110, 120 have a base end joined to a ring of material fixed or coupled to the first wall 50 by welding the ring of material. In addition, a moveable free end portion of the sheet members 110, 120 forms a sealing engagement with the second wall inner surface 90 to substantially enclose the cavity 70 with an adjustable pressure Pcavity therein. As shown in FIG. 2, the second inner surface 90 may include an annular shaped dam 125 protruding therefrom to facilitate formation of the sealing engagement.

As shown in FIG. 1, each of the first sheet members 110 has an opposite edge 130 out of alignment with opposed edges 140 of adjacent second sheet members 120. Since the flexible sheet members 110, 120 preferably have the same circumferential width, the first sheet members 110 overlap gaps positioned between the opposite edges 140 of the second sheet members. This aids in sealing the cavity 70 around the shaft 20 and prevents axial leakage along these gaps. Although both the first and second sheet members 110, 120 have base ends coupled to the first wall 50, each of these sheet members 110, 120 is independent along the remainder of their lengths.

As shown in FIGS. 1 and 2, the housing 30 includes at least one passage 150 in the first wall 50 for placing the cavity 70 in fluid communication with the system pressure Psystem. Preferably, the pressure within the cavity Pcavity is equal to or substantially equal to the system pressure Psystem. However, the cavity pressure Pcavity may be from about 98% to about 95% percent of the system pressure Psystem.

The sealing apparatus 10 further comprises a plurality of fingers 160 extending from proximate the first wall 60 toward the low pressure area at discharge pressure Pdischarge. As shown in FIGS. 1, 2, and 3, each of the fingers 160 includes a flexible bridge portion 170 having a ring of material fixed or coupled to either the first wall 50 or the first sheet member 110 by welding or other known means of attachment. In addition, each finger 160 has a tip portion 180 having a free end. This free end of the tip portion 180 is positioned such that the sealing engagement of the member 100 and the second wall inner surface 90 is located closer than this tip portion free end to the first wall inner surface 80. In other words, the free end of tip portion 180 is positioned further than the sealing engagement from the first wall inner surface 80.

As shown in FIG. 1, the fingers 160 are annularly positioned around the shaft 110 and circumferentially spaced from each other. As will be explained in more detail below, during rotation of the shaft 20, the tip portions 180 actually "ride" upon a thin film of gas (or liquid) with a clearance h above the surface of the shaft 20. In addition, these tip portions 180 also "ride" above the surface of the shaft 20 during non-rotating conditions. Thus, the seal apparatus 10 is compliant, or, in other words, able to follow radial shaft vibrations, shaft diameter changes, non-concentric shaft rotation, or other deviations of shaft 20.

The bridge portion 180 of the finger 160 is preferably more flexible than the tip portion 160. As described below, this difference in flexibility enables bending to take place in bridge portion 170, while tip portion 180 remains substantially parallel with the adjacent shaft 20. Bridge portion 170 may be weakened, or tip portion 160 may be stiffened, by any known structural modification or a thermal, chemical, or material treatment. As will be described in detail below, in a preferred embodiment the flexible bridge portion 170 may include slots and/or a reduced thickness as shown in FIGS. 10–13.

Figure 3:
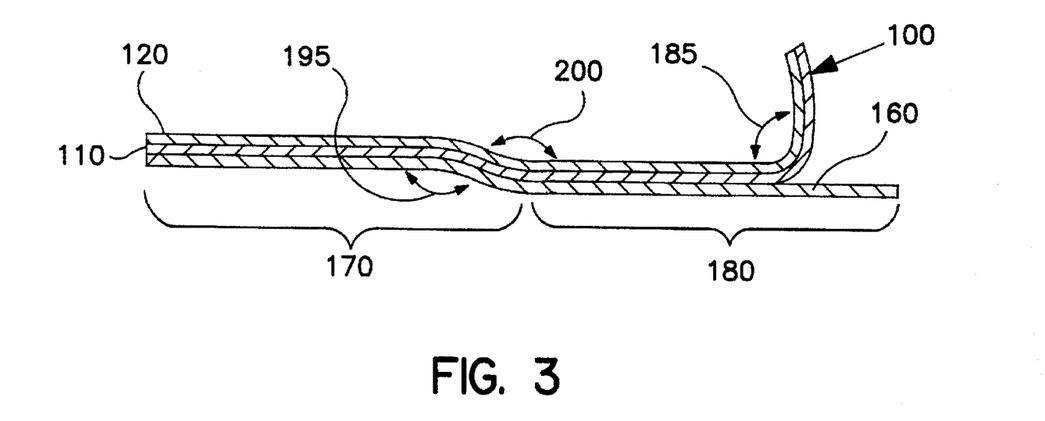
FIG. 3 is an enlarged cross-sectional view of a finger and a member of the compliant seal apparatus of FIGS. 1 and 2.

As shown in FIGS. 1 and 3, each of the first flexible sheet members 110 of the member 100 lay along an upper surface of the fingers 160. Each of the first flexible sheet members 110 may be attached to the fingers 160 adjacent to the first wall 50, however other portions of each of the first flexible sheet members 110 are preferably unconnected to the upper surface of the fingers 160. Whether connected or not to the fingers 160, as shown in FIG. 2 at least a portion of each member 110 extends from an upper surface of a corresponding finger or fingers into the cavity 70.

Each of the fingers 160 and flexible sheet members 110, 120 form a triple ply or layered construction, as shown in FIG. 3. Preferably, both the top and bottom surfaces of the first flexible sheet members 110 lack any connection or attachment to the second flexible sheet member 120 and the finger 160, except for any coupling attachment to wall 50. Therefore, the fingers 160, and the sheet members 110, 120 may flex or bend independently without any connection between them.

As illustrated in FIG. 3, an arc shaped bend 185 in each member 100 extends a free end of each member 100 into the cavity 70 from the upper surface of the finger 160. The arc shaped bend 185 preferably has a radius of curvature of less than 90 degrees. This facilitates formation of the sealing engagement between the member 100 and the second inner wall surface 90 when the member 100 flexes towards or away from the shaft 20.

As mentioned above, each of the fingers 160 are independent of the first and second sheet members 110, 120, except, of course, where the fingers 160 are coupled to the first wall 50. However, the top surface of the fingers 160 contacts the bottom surface of the sheet member 110 to dampen vibration and prevent oscillations.

As mentioned above, the first sheet members 110 may have opposite edges 130 out of alignment with the opposed edges 140 of the second sheet members 120. In addition, as shown in FIG. 1, the opposite edges 130 of each of the first sheet members 110 are also preferably out of alignment with opposed edges 190 of each of the fingers 160. Since the fingers 160 are preferably approximately the same circumferential width as the first sheet members 110, the fingers 160 overlap gaps positioned between adjacent first sheet members 110. This inhibits axial pressure leakage along these gaps and further aids in sealing the cavity 70.

As shown in FIGS. 2 and 3, the first and second sheet members 110, 120 and the bridge portion 170 of each finger 160 preferably include a first bend 195 in a direction away from the cavity 70 and a second bend 200 in a direction toward the cavity 70. These bends orient the bridge portion 170 of the finger 160 closer to the cavity 70, while the tip portion 180 is spaced closer to the shaft 20.

Preferably, the flexible sheet members 110, 120 and fingers 160 comprise a material having a high yield strength at high temperatures. For example, these elements may comprise a high temperature aerospace alloy such as Inconel® 718, Inconel® 956, or Rene41. Another preferred material is Haynes 214, which forms a tenacious oxide layer at high temperatures to provide possible tribological advantages. Again, it should be understood that the composition of the sheet members 110, 120 and fingers 160 can be varied depending on the particular application with which the compliant seal apparatus 10 is to be used.

Although the fingers 160 do not contact the shaft 20 during most operating conditions, the surface of either one of these components may be coated to reduce friction during infrequent contact. For example, the shaft 20 may include a tribological material coating. Because the fingers 160 are spaced circumferentially close to one another, any friction reducing coating on the fingers 160 is preferably very thin. Optionally, the fingers 160 may include a thin friction reducing coating, such as titanium nitride, applied in a process, such as physical vapor deposition or chemical vapor deposition.

The dimensions of each of the components of the sealing apparatus 10 may be varied without departing from the invention. Each of the first and second flexible sheet members 110, 120 may, for example, be 0.0025–0.003 inch thick, while the thickness of the finger 160 may be 0.003–0.012 inch. Typically, the circumferential spacing between the edges 190 of adjacent fingers 160, the edges 130 of adjacent first sheet members 110, and the edges of adjacent second sheet members 120 is 0.006–0.010 inch.

Preferably, the tip portion 180 extends an axial distance of 30–40% of the total length of the tip portion 180 beyond the sealing engagement of both member 100 and second wall inner surface 90. Each of the fingers 160 may, for example, have an axial length of 0.625–1.00 inch and a circumferential width of 0.324–1.25 inches. However, when the fingers 160 have a width of 0.625 inch or greater, preferably, the bridge portion 170 includes slots, as will be described later. Typically, the bridge portion 170 is positioned 0.025–0.030 inch from the shaft 20, and the clearance h between the tip portion 180 and shaft 22 is 0.0002–0.0008 inch. When the tip portion 180 has a leading edge lifted from the shaft 20, as described below and shown in FIG. 21, this clearance h is an average clearance of the tip portion 180 and shaft 22. Of course, it should be understood that these dimensions have been indicated for purposes of explanation only without intending to limit the scope of the invention.

Figure 4:
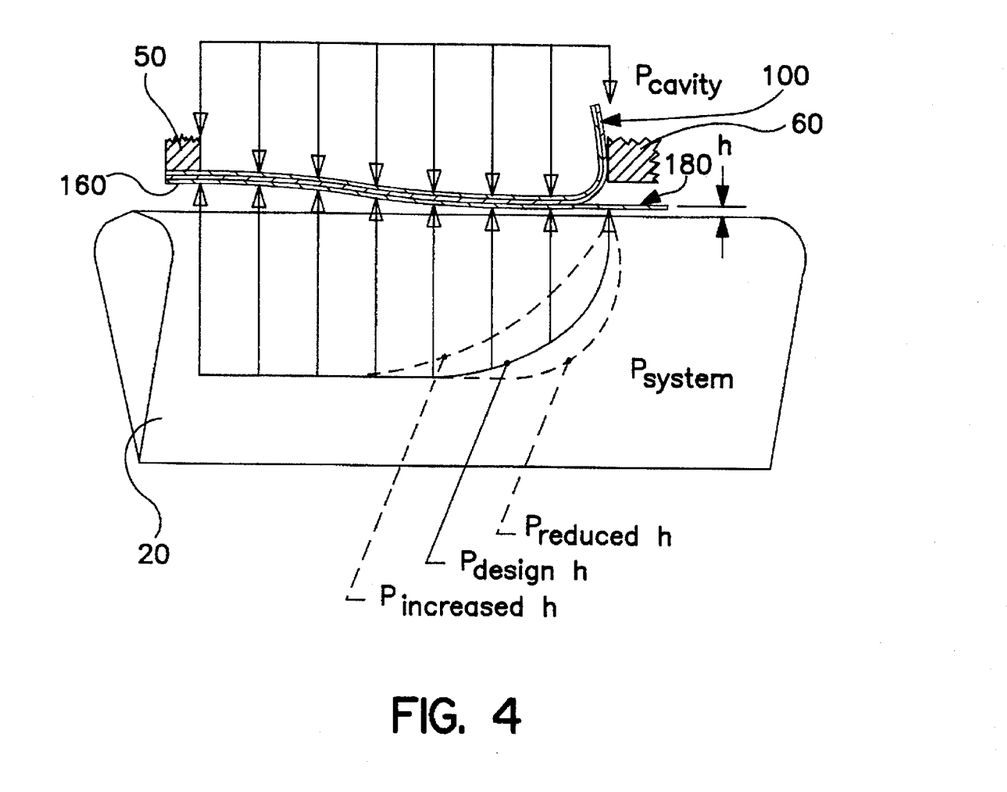
FIG. 4 is a pressure distribution of the finger and the member of the compliant seal apparatus of FIGS. 1 and 2 when the shaft is not rotating.

FIG. 4 is a hydrostatic pressure distribution diagram of the member 100 and the finger 160 of the sealing apparatus 10 when the shaft 20 is not rotating. Pdesign shows the pressure distribution for a design clearance h for which a nominal force balance is designed. If the shaft 20 moves so as to decrease the design clearance h, the pressure distribution under the finger 160 changes as shown by Preduced, and the total force under the finger 160 increases. Conversely, if the shaft 20 moves so as to increase the design clearance h, the pressure distribution changes as shown by Pincreased, and the total force under the finger 160 decreases. It should be appreciated that the principle of hydrostatic balance used for this design is much the same as for hydrostatically balanced gas face seals.

Figure 5:
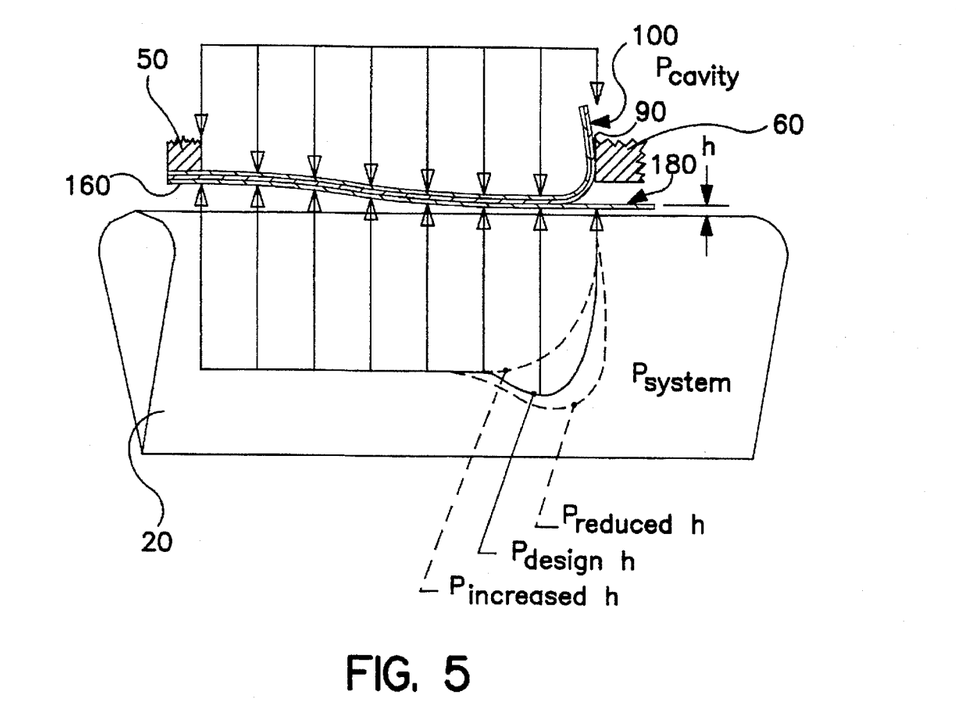
FIG. 5 is a pressure distribution of the finger and the member of the compliant seal apparatus of FIGS. 1 and 2 when the shaft is rotating.

FIG. 5 is a diagram, similar to that of FIG. 4, showing a hydrodynamic pressure distribution when the shaft 20 is rotating and the design clearance h changes. It should be appreciated that the hydrostatic force balance has an extremely fast acting response time. Thus, even hydrostatically (with pressure forces only) the fingers 160 follow high speed motion of shaft surface during conditions such as runout of the shaft surface.

The hydrodynamic forces caused by shaft rotation further increases film stiffness between each of the fingers 160 and the shaft 20. In addition, these hydrodynamic forces further enhance the ability of the fingers 160 to dynamically track shaft 20 motions due to runout and fast radial excursions.

Figure 6:
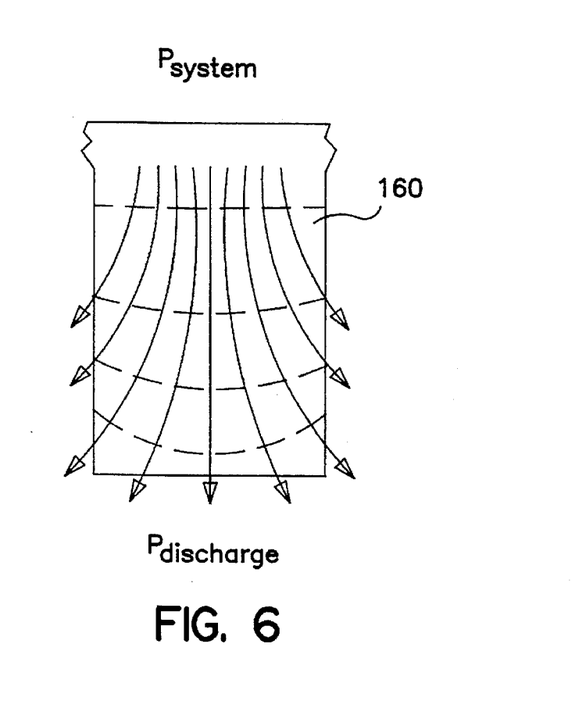
FIG. 6 is a flow diagram of the finger of FIGS. 1 and 2.

A typical one of fingers 160 is shown in the flow diagram of FIG. 6. The solid lines represent the direction of the flow field of the gas (or liquid), and the dotted lines represent lines of constant pressure between the shaft 20 and the underside of the finger 160.

Figure 7:
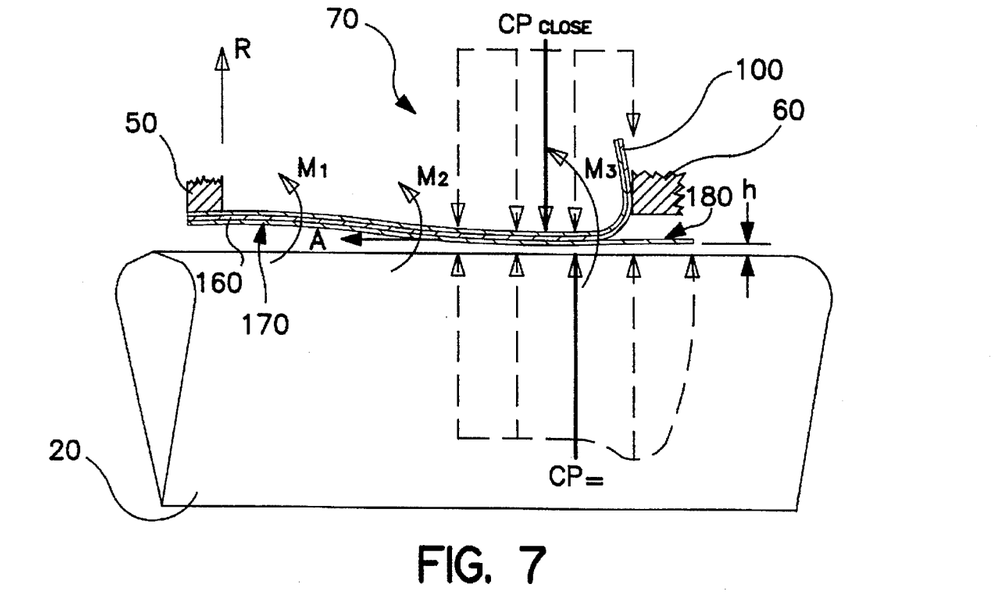
FIG. 7 is a diagram of conditions along a portion of the finger and the member of the compliant seal apparatus of FIGS. 1 and 2 when the rotating shaft is spaced in a desired orientation with respect to the finger.

FIG. 7 is a diagram of a partial pressure distribution, forces, and moments when the rotating shaft 20 is spaced in a desired parallel laydown position with respect to the tip portion 180. Forces acting in both a vertical and horizontal direction generate, respectively, opposite "weld" reaction forces R and A in finger 160 and member 100. These forces also generate moments $M_1$ and $M_2$ transmitted both within the bridge portion 170 of finger 160, and above the bridge portion 170 within the member 100. The moments generate bending in the flexible bridge portion 170 to assist in orienting the tip portion substantially parallel to the surface of the shaft 20.

As shown in FIG. 7, above the tip portion 180, a closing pressure within the cavity 70, having a center of pressure $CP_{CLOSE}$, acts to close the tip portion 180 toward shaft 20. Additionally, when the shaft 20 is spaced parallel to the tip portion 180 with a design clearance h, an opening pressure acts under the tip portion 180 with a center of pressure $CP_=$. Because these centers of pressure $CP_{CLOSE}$ and $CP_=$ are located at different axial positions, a moment $M_3$ is generated. As with the above described moments $M_1$ and $M_2$, moment $M_3$ initiates bending in the flexible bridge portion 170 to place tip portion 180 substantially parallel to the surface of the shaft 20. Thus, sealing between each of the fingers 160 and shaft 20 is improved.

Figure 8:
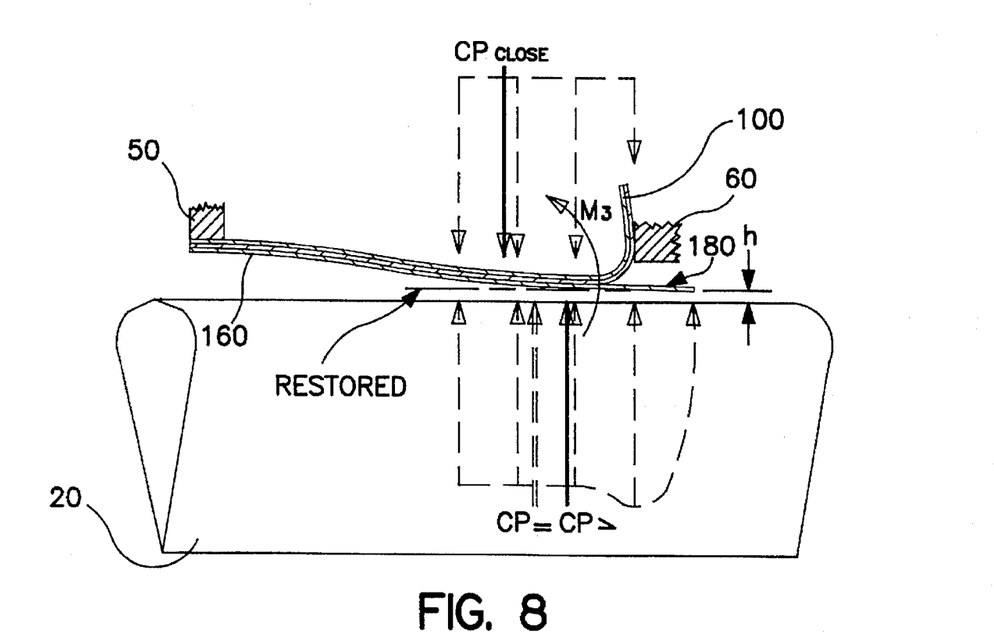
FIG. 8 is a diagram of conditions along a portion of the finger and the member of the compliant seal apparatus of FIGS. 1 and 2 when the rotating shaft approaches a free end of a tip portion of the finger.

When the surface of the shaft 20 moves from its the desired orientation shown in FIG. 7, the moment $M_3$ changes to restore the tip portion 180 to a desired substantially parallel laydown orientation. As shown in FIG. 8, the surface of the rotating shaft 20 may approach the free end of tip portion 180. This movement of the shaft surface may be caused by any number of different conditions, such as a centrifugal or thermal diameter increase, or a non-concentric rotation. If this "converging wedge configuration" exists for even an extremely brief period of time, the seal between the tip portion 180 and shaft 20 will lose effectiveness. However, because the pressure distribution acting under the tip portion 180 changes in the "converging wedge orientation", the center of pressure $CP_>$ is spaced axially closer than $CP_=$ to the free end of tip portion 180. Thus, the moment $M_3$ increases to restore the tip portion 180 to a "Restored" laydown orientation substantially parallel to the outer surface of shaft 20. Therefore, proper sealing between the tip portion 180 and shaft 20 is maintained.

Figure 9:
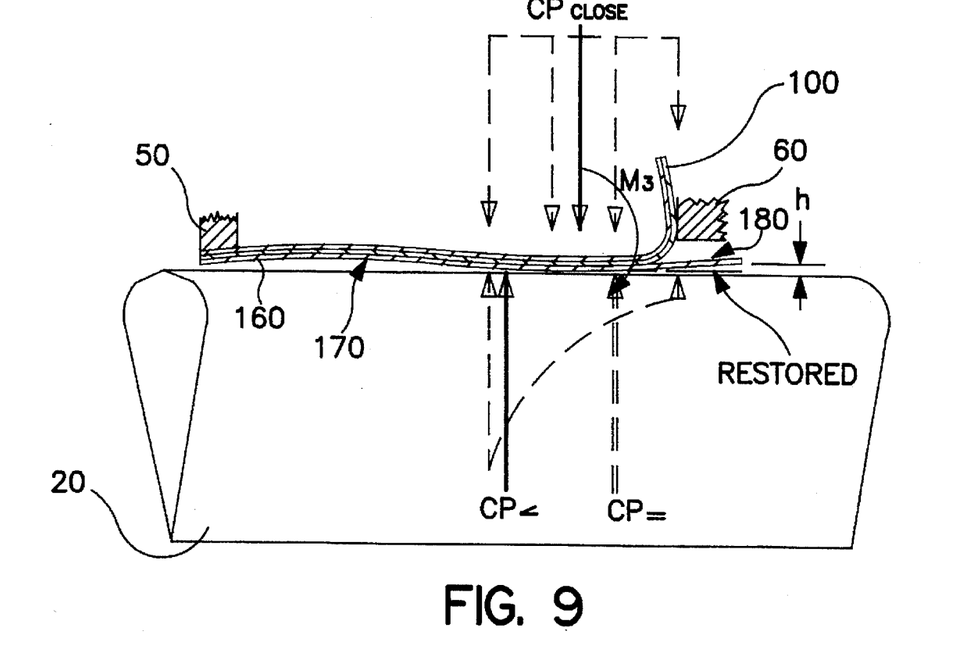
FIG. 9 is a diagram of conditions along a portion of the finger and the member of the compliant seal apparatus of FIGS. 1 and 2 when the rotating shaft approaches a tip portion of the finger adjacent to a bridge portion.

In a similar manner, if the rotating shaft 20 approaches the tip portion 180 adjacent to bridge portion 170, as shown in FIG. 9, this "diverging wedge orientation" axial locates the center of pressure $CP_<$ closer to the bridge portion 170. Thus the moment $M_3$ changes direction from that shown in FIG. 7 to restore the tip portion 180 to the "Restored" laydown orientation substantially parallel with the surface of the shaft 20. This again automatically reestablishes a proper seal between the tip portion 180 and shaft 20.

As shown in FIGS. 10–13, the bridge portion 170 of the finger 160 can be configured to increase flexibility. Slots 210 can be placed in the bridge portion 170 of fingers 160 and in first and second sheet members 110, 120 at locations above the bridge portion 170. The slots 210 extend from proximate the first wall 50 to proximate the tip portion 180 to weaken the bridge portion 170 and the sheet members 110, 120. In a preferred embodiment, the bridge portion 170 includes 2 to 4 slots 210 when the tip portion 180 has a circumferential width of 0.625–1.25 inches. In addition, each of the slots 210 is typically 0.060–0.010 inch wide.

Figure 12:
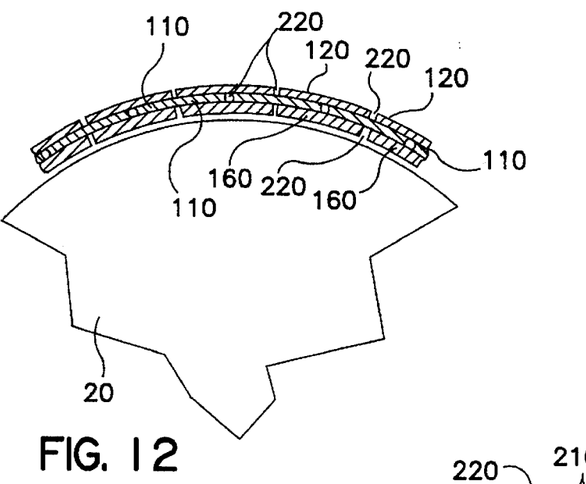
FIG. 12 is cross-sectional view on line 12—12 of FIG. 11 illustrating a relationship of edges of sheet members and edges of the finger.
Figure 13:
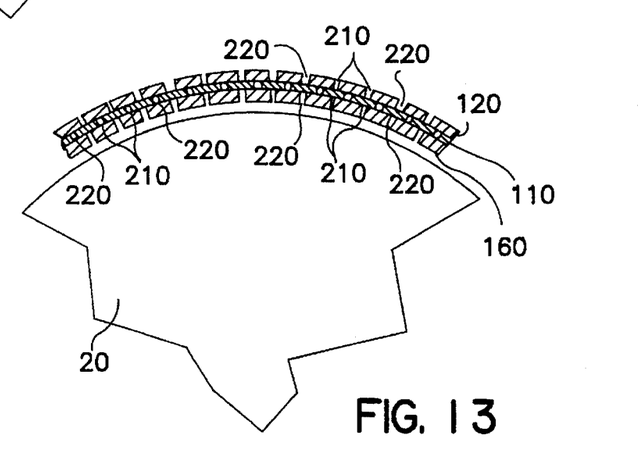
FIG. 13 is cross-sectional view on line 13—13 of FIG. 11 illustrating a relationship of edges of the sheet members, edges of the fingers, and slots.
Figure 14:
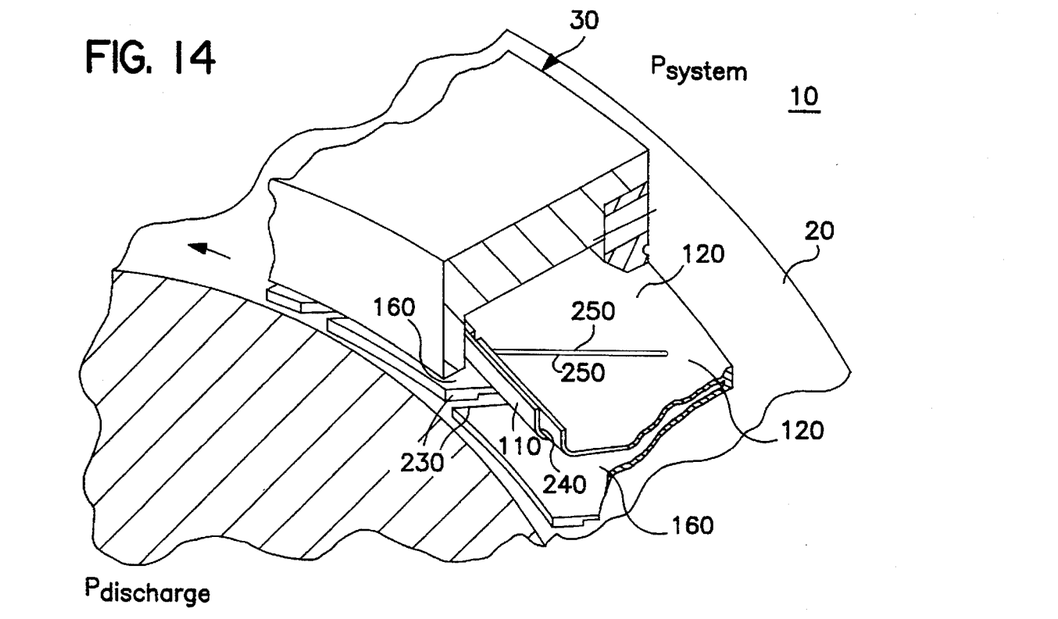
FIG. 14 is perspective view of the compliant seal apparatus of FIGS. 1 and 2 having edges of both the fingers and sheet members angled with respect to an axis of a housing.

As shown in FIGS. 12 and 14, the fingers 160 and sheet members 110, 120 are preferably curved in a plane parallel to the first wall inner surface 80 and the second wall inner surface 90. FIG. 13 illustrates how the slots 210 may be positioned between the circumferential spaces 220 of adjacent fingers 160, adjacent first sheet members 110, and adjacent second sheet members 120. The slots 210 in the first sheet member 110 preferably are out of alignment with both the slots 210 and circumferential spaces 220 of both the fingers 160 and the second sheet member 120. Thus, pressure leakage through the slots 210 and circumferential spaces 220 is prevented.

Figure 10:
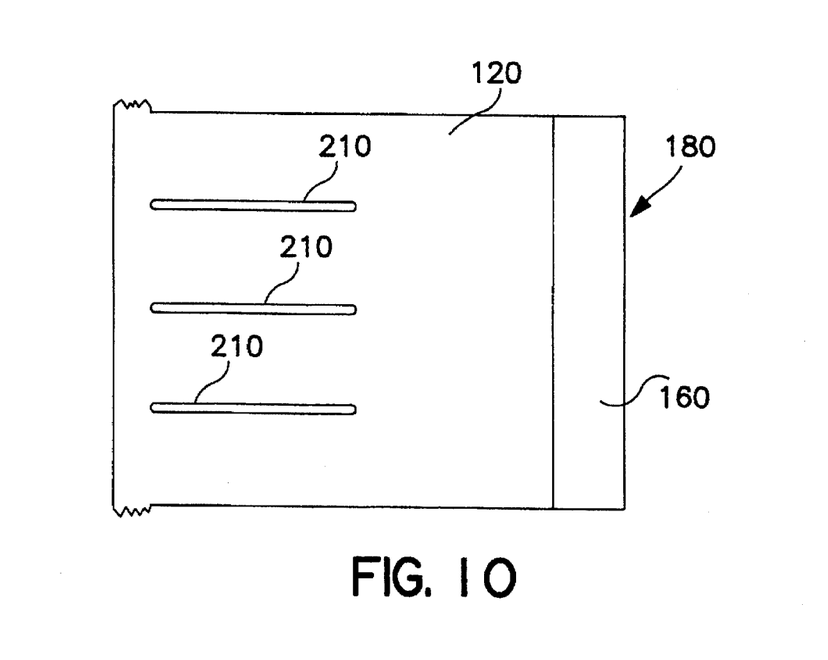
FIG. 10 is a top view of a finger and a member of FIGS. 1 and 3 including slots formed in both the member and the bridge portion of fingers.
Figure 11:
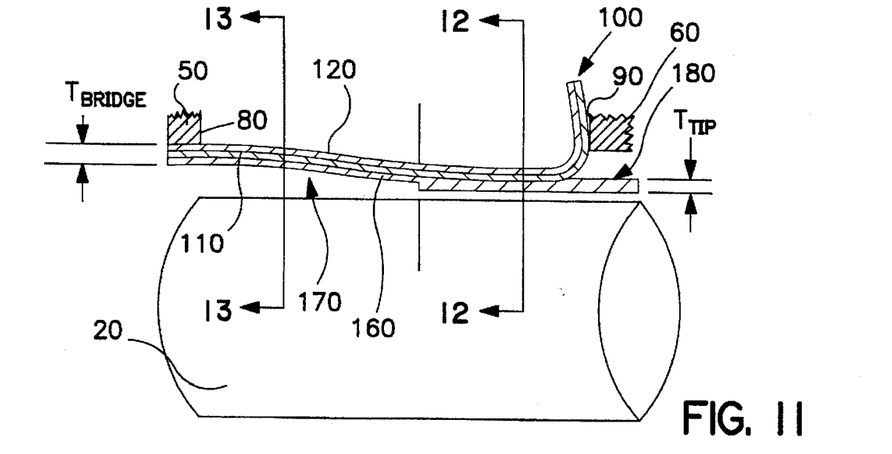
FIG. 11 is side view of the member and the finger of FIG. 10 illustrating a finger having a varying thickness.

As shown in FIG. 2, the bridge portion 170 can have substantially the same thickness as that of the tip portion 180. However, as shown in FIG. 11, to increase the flexibility of the bridge portion 170, the bridge portion 170 may be thinner than the tip portion 180. In this preferred embodiment, the bridge portion 170 has a thickness $T_{Bridge}$ of 0.003–0.005 inch, while the tip portion 180 has a thickness $T_{Tip}$ of 0.006–0.012 inch. The bridge portion 170 may include both the slots 210 and the reduced thickness as shown in FIGS. 10–11. Alternatively, one or both of the slots 210 and reduced bridge portion thickness may be omitted.

As shown in FIG. 14, to augment the lift-off for a preferred direction of rotation of the shaft 20, the fingers 160 and sheet members 110, 120 can be arranged such that their respective edges 230, 240, 250 are angled with respect to the axis of the compliant seal device 10 (or the shaft 20). This positions the free end faces of the fingers 160 and sheet members 110, 120 away from the direction of rotation of the shaft 20. As the shaft 20 rotates, the angling causes capture of gas (or liquid) not only from these free ends, but also from the fact that the fingers 160 are partially wrapped over the diameter of the shaft 20, and act like "foil bearings." The increased pressure causes additional lift-off and clearance of the fingers 160 from the shaft 20.

Figure 15:
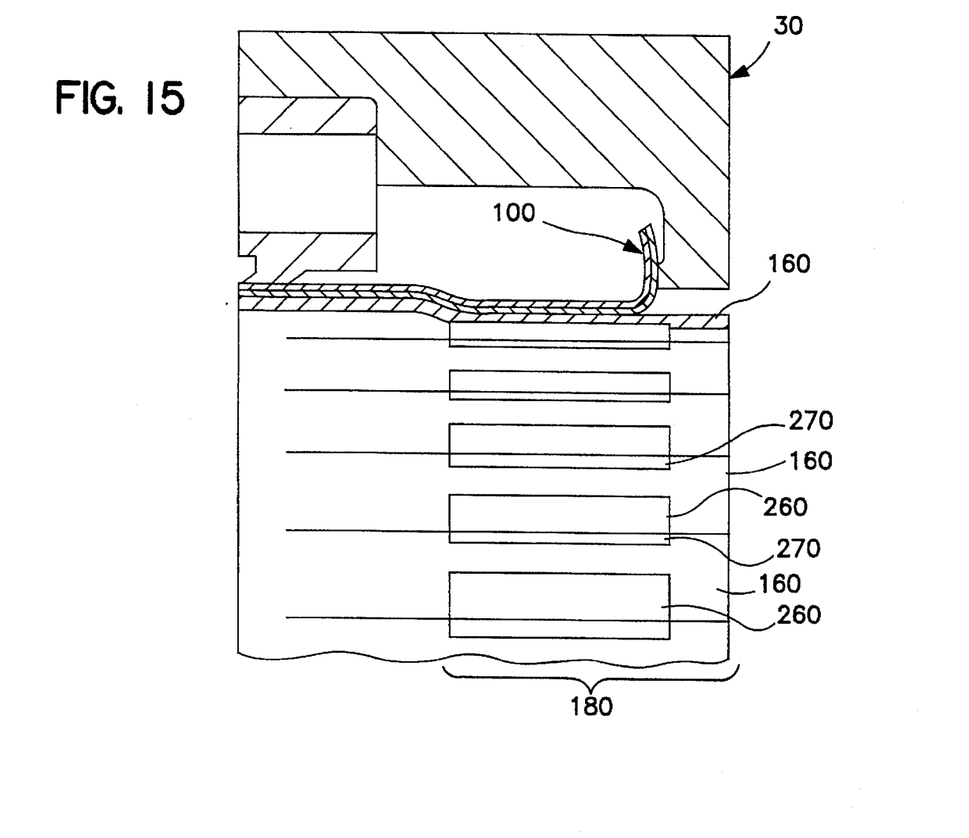
FIG. 15 is a partial cross sectional view of a compliant seal apparatus of FIGS. 1 and 2 having recesses formed along edges in the lower surfaces of the fingers.
Figures 16, 17:
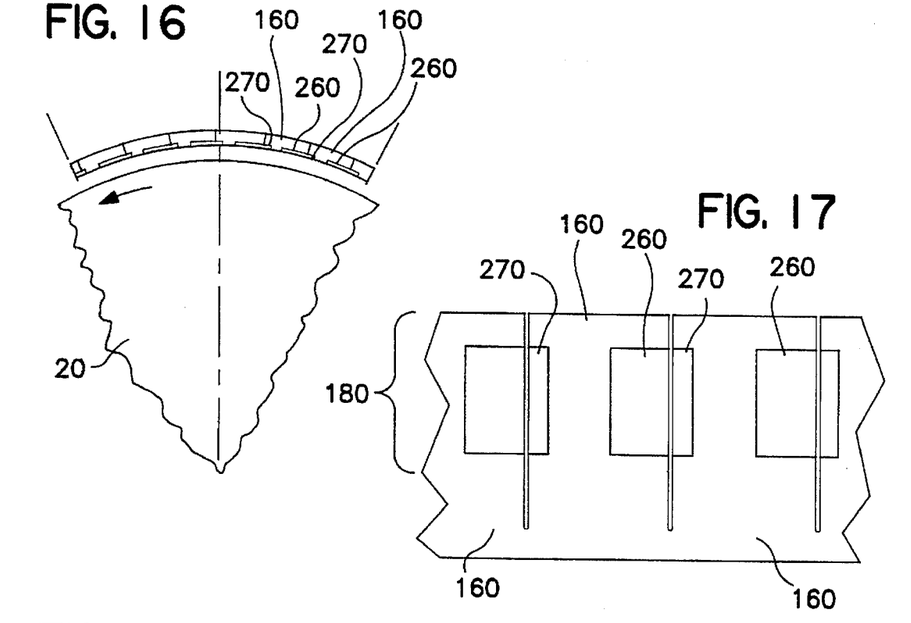
FIG. 16 is a front view of a portion of the fingers of FIG. 15.
FIG. 17 is a bottom surface view of the fingers of FIG. 15.

As shown in FIGS. 15–17, to further augment the lift-off for a preferred direction of rotation of the shaft 20, each of the fingers 160 can include one or more recesses 260, 270 formed on the lower side of the tip portion 180 proximate the shaft 20. The recesses 260, 270 can comprise any one of an open Rayleigh pad, a closed Rayleigh pad, a shrouded Rayleigh pad, a spiral groove terminating in a dam, a radial groove, or an angled groove. Alternative designs for the recesses 260, 270 can also be utilized as is known in the art. Further, the recesses 260, 270 can be chemically milled, ion etched or made by other means known in the art.

As shown in FIGS. 15–17, each finger 160 may include both a first recess 260 positioned along a leading edge of the finger 160 that faces the direction of rotation of shaft 20. In addition, each finger 160 may also include a second recess 270 located along a trailing edge of each finger 160. Each of the recesses 260, 270 extend axially along the tip portion 180 and have a typical axial length of at least 0.250 inch. The recesses 260, 270 end before reaching the free end of the tip portion 180 to allow the system pressure Psystem to enter underneath the free end of the tip portion 180, thereby creating a balancing force which creates an additional lifting force.

As clearly shown in the preferred embodiment of FIGS. 15–17, the first recess 260 at the leading edge of the finger 160 has a circumferential width greater than that of the second recess 270. When the wider first recess 260 is positioned at the leading edge of the finger 160, the finger 160 may tilt so that the leading edge lifts higher than the trailing edge from the shaft surface. However, the first and second recesses 260, 270 may also have an equal circumferential width. When the finger 160 includes the first and second recesses 260, 270, hydrodynamic lift-off is improved.

Figure 18:
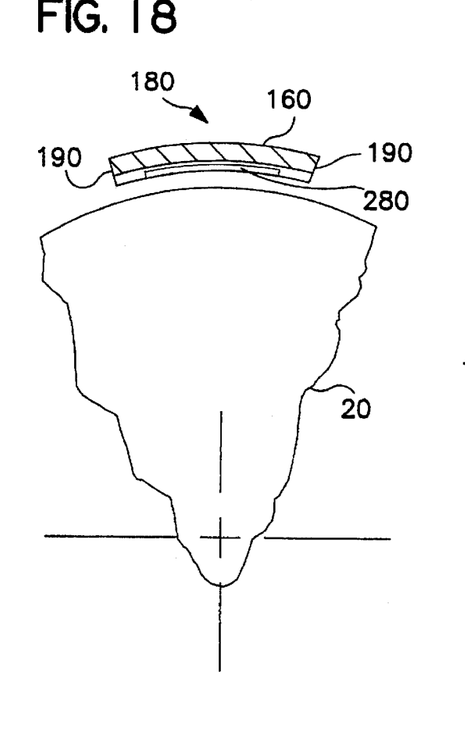
FIG. 18 is a front view of a finger of FIGS. 1 and 2 having a recess formed in the lower surface of the finger between edges of the finger.
Figure 19:
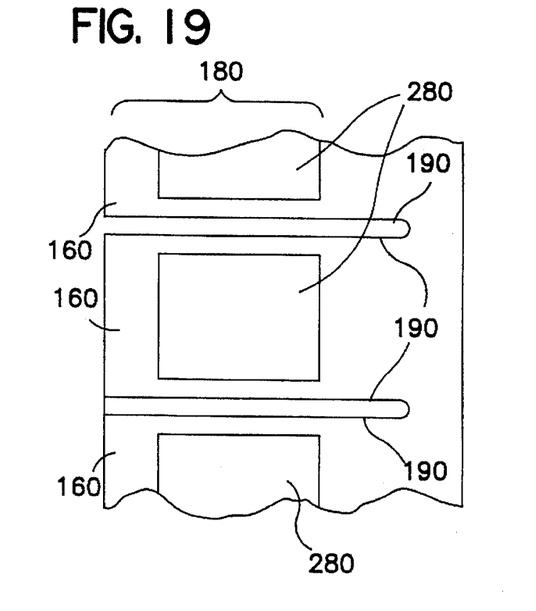
FIG. 19 is a bottom surface view of fingers including the recesses of FIG. 18.

As shown in FIGS. 18 and 19, alternatively, each finger 160 includes a single recess 280 positioned on the lower surface of the tip portion 180 between opposite finger edges 190. Recesses 280 are constructed similar to the recesses 260, 270 described, above. This design improves the hydrostatic lift-off of finger 160.

It should be appreciated that the configurations shown in FIGS. 15–19 increase lift-off by incorporating step bearing principles similar to Rayleigh pad designs on face seals. Although recesses 260, 270, 280 slightly increase the operating film thickness h and the leakage along the shaft 20, the gas film stiffness is increased to provide improved dynamic tracking action of the seal apparatus 10.

Figure 20:
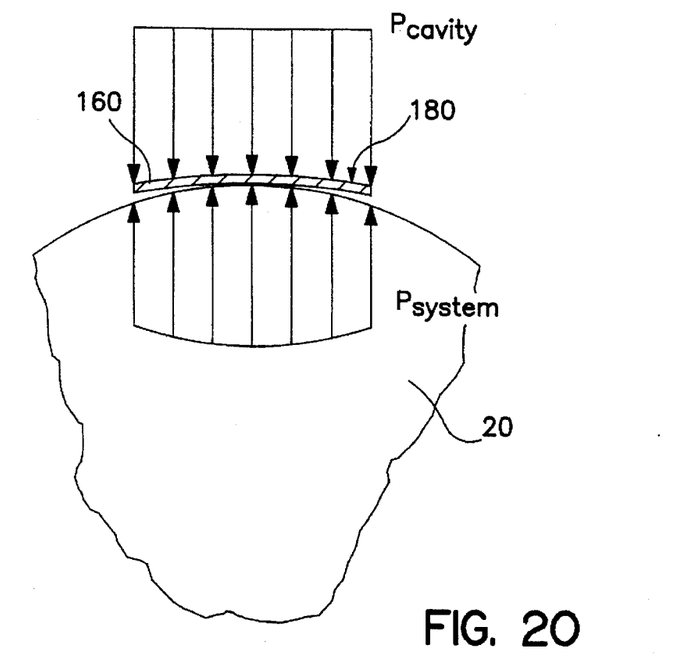
FIGS. 20 is pressure distribution diagram of a finger of FIGS. 1 and 2 having a radius of finger curvature greater than a radius of the shaft.
Figure 21:
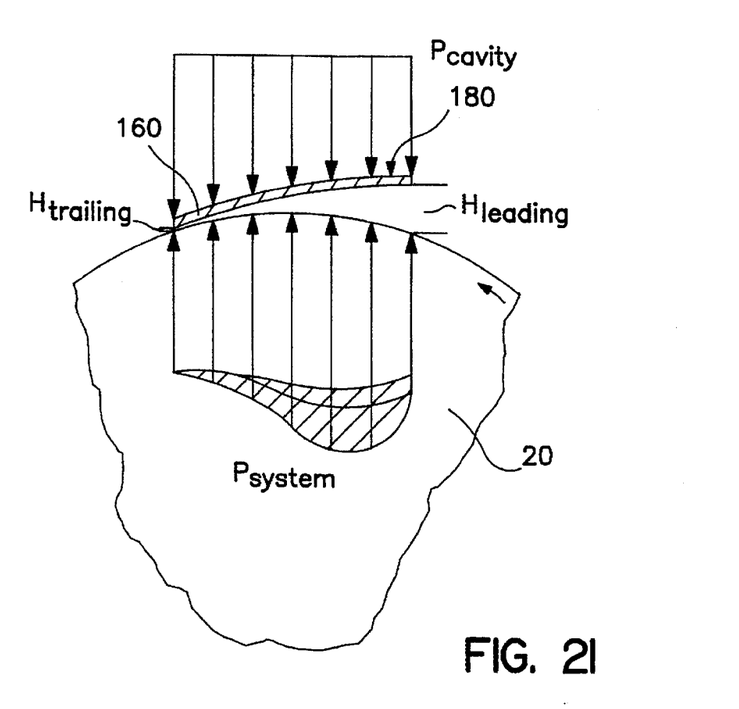
FIG. 21 is a pressure distribution diagram of the finger of FIG. 20 during shaft rotation.

Each of the fingers 160 of the compliant seal apparatus 10 may be configured to lift away from the shaft 20 in response to rotation of the shaft 20. As shown in FIGS. 20 and 21, this may be accomplished by curving the tip portions 180 of the fingers 160 in the same direction as the curvature of the shaft 20, wherein the radius of curvature of the tip portion 180 is preferably greater than the radius of the curvature of the shaft 20. In addition, this mismatch in curvature may also be accomplished by heating the bottom surface of the tip portion 180 by the shear film of gas positioned above the shaft 20 to curl the opposite finger edges by thermal expansion, and thus improve gas film stiffness. Further, the mismatch in curvature may also take place by combining this thermal deformation with the above mentioned preformed curvature of the finger 160.

During rotation of the shaft 20, the curvature mismatch cause a hydrodynamic lift-off action due to viscous effects of the gas (or liquid). Under rotating conditions, the lifting means captures gas (or liquid) at the leading edge of the finger. This increases the pressure under the fingers 160 to cause the fingers 160 to bend, and lift-off to occur. The fingers 160 will ride upon a thin film of gas (or liquid) between the fingers 160 and the shaft 20, thereby making the fingers 160 compliant to tolerances in the surface of the shaft 20 and differential thermal and centrifugal growth of the shaft 20, as well as variations in the concentricity between the shaft 20 and seal bores (not shown) and rotational runout of the shaft 20.

As the fingers 160 lift off, they will also twist slightly, as shown by FIG. 21, so that their leading edges will operate at a larger clearance $H_{Leading}$ than the clearance of their trailing edges $H_{Trailing}$. Typically, the ratio of the clearance at the leading edge $H_{Leading}$ to the clearance of the trailing edge $H_{Trailing}$ is between 2 to 1 and 3 to 1. For example, if the clearance at the trailing edge $H_{Trailing}$ is 0.000150 inch the clearance at the leading edge $H_{Leading}$ would be between 0.000300 to 0.000450 inch.

FIG. 20 shows a typical pressure profile through the tip portion 180 of an individual one of the fingers 160 during stationary shaft conditions.

FIG. 21 shows a typical pressure distribution through the same section of the tip portion 180 of finger 160 shown in FIG. 20 as the shaft 20 rotates. At the edge of the finger 160, pressure is equal to the local pressure in the space between the fingers 160. Between the finger 160 and the shaft 20, however, pressure builds up because of viscous hydrodynamic effects. A typical pressure distribution under a rotating condition shows that the pressure radially inside the finger 160 is greater than the pressure radially outside the finger 160 and the finger 160 thus lifts from the shaft 20.

Because the mismatched curvature provides hydrodynamic lift, recesses 260, 270, 280, shown in FIGS. 15–19, are not necessarily required for hydrodynamic lift-off. Therefore, fingers 160 having a mismatch curvature may not have one of the recesses 260, 270, 280. Conversely, fingers 160 including recess 260, 270, 280 can have the same radius of curvature as the shaft 20. Nevertheless, the fingers 160 may have both recesses 260, 270, 280 and a mismatch in curvature with the shaft 20.

A seal according to any of the foregoing embodiments shows improved sealing compared to both prior labyrinth seals and compliant seals. In addition, the present invention provides for improved hydrostatic and hydrodynamic force balancing, thereby minimizing rotordynamic excitation effects by transmitting minimum radial force to the shaft. Still further, once a nominal force balance is achieved, the present invention allow for a very high frequency force balance response.

Additional advantages and modifications will readily occur to those skilled in the art. For example, although the foregoing embodiments have been described with respect to an annularly shaped seal, the teachings of the present invention can also be applied toward linear seals. Further, the teachings of the present invention can be applied toward co-rotating, counter rotating, and static sealing applications.

Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A compliant sealing apparatus for sealing a high pressure area from a low pressure area, the sealing apparatus comprising:

a housing including:
a first wall positioned proximate the high pressure area, and
a second wall positioned proximate the low pressure area, said first and second walls positioned adjacent each other with facing inner surfaces of said walls defining, at least in part, a cavity therebetween;

at least one finger extending from proximate the first wall toward the low pressure area, the finger including a free end; and at least one member extending from an upper surface of the finger into the cavity to form a sealing engagement with the second wall inner surface, the sealing engagement being located closer than the free end to the first wall inner surface.

2. The sealing apparatus of claim 1, wherein the housing includes at least one passage for placing the cavity in fluid communication with the high pressure area such that a pressure within the cavity substantially equals a pressure of the high pressure area.

3. The sealing apparatus of claim 1, wherein the finger includes a bridge portion coupled to the first wall and a tip portion adjacent the bridge portion, the tip portion having the free end, the bridge portion being more flexible than the tip portion.

4. The sealing apparatus of claim 3, wherein the finger is curved in a plane oriented parallel to one of the first and second wall surfaces, and the bridge portion includes at least one slot extending from a position proximate the first wall surface to a position proximate the tip portion.

5. The sealing apparatus of claim 4, wherein the tip portion has a width in the plane ranging from about 0.625 inches to about 1.25 inches, and the bridge portion includes 2 to 4 slots.

6. The sealing apparatus of claim 3, wherein a thickness of the bridge portion is less than a thickness of the tip portion.

7. The sealing apparatus of claim 3, wherein a thickness of the bridge portion is substantially the same as a thickness of the tip portion.

8. The sealing apparatus of claim 1, wherein the second wall inner surface includes a protruding dam, the sealing engagement of the member being formed at the dam.

9. The sealing apparatus of claim 3, wherein the tip portion includes a lower surface opposite the upper surface, the lower surface including at least one recess formed therein.

10. The sealing apparatus of claim 9, wherein the recess includes at least one of an open Rayleigh pad, a closed Rayleigh pad, a shrouded Rayleigh pad, a radial groove, and a spiral groove.

11. The sealing apparatus of claim 9, wherein tip portion includes opposite edges, the recess being located between the opposite edges.

12. The sealing apparatus of claim 9, wherein the tip portion includes first and second opposite edges, and the at least one recess includes a first recess positioned along the first edge and a second recess positioned along the second edge.

13. The sealing apparatus of claim 12, wherein the first recess has a width extending in a plane oriented parallel to one of the first and second wall surfaces, and the second recess has a width extending in the plane, the width of the first recess being greater than the width of the second recess.

14. The sealing apparatus of claim 3, wherein the bridge portion includes a first bend in a direction away from the cavity and a second bend in a direction toward the cavity, such that the bridge portion is positioned generally closer to the cavity than the tip portion.

15. The sealing apparatus of claim 1, wherein the finger has two opposed edges, the two opposed edges being angled with respect to a central axis of the sealing apparatus.

16. The sealing apparatus of claim 1, wherein the member includes both a first flexible sheet member positioned on the upper surface of the finger and a second flexible sheet member positioned on a top surface of the first sheet member, the first and second sheet members each having a base end coupled to the first wall and a free end positioned within the cavity.

17. The sealing apparatus of claim 16, wherein the first sheet member includes two opposed edges, each of the two opposed edges being out of alignment with an edge of the second sheet member.

18. The sealing apparatus of claim 16, wherein the first sheet member includes two opposed edges, each of the two opposed edges being out of alignment with an edge of the finger.

19. The sealing apparatus of claim 1, wherein the member includes an arc shaped bend extending from proximate the upper surface of the finger toward a free end of the member, the arc shaped bend having a radius of curvature of less than 90 degrees.

20. A compliant sealing apparatus for sealing a high pressure area from a low pressure area, the sealing apparatus comprising:
   an annular housing including:
      a first annular wall positioned proximate the high pressure area,
      a second annular wall positioned proximate the low pressure area, said first and second walls positioned adjacent each other with facing inner surfaces of said walls defining, at least in part, a cavity therebetween;
   a plurality of fingers, each of the fingers extending from proximate the first wall toward the low pressure area and including a free end; and
   a plurality of members, each of the members extending from an upper surface of each the fingers into the cavity to form a sealing engagement with the second wall inner surface, the sealing engagement being located closer than the free end to the first wall inner surface.

21. The sealing apparatus of claim 20, wherein the housing includes at least one passage for placing the cavity in fluid communication with the high pressure area such that a pressure within the cavity substantially equals a pressure of the high pressure area.

22. The sealing apparatus of claim 20, wherein each of the fingers includes a bridge portion coupled to the first wall and a tip portion adjacent the bridge portion, the tip portion having the free end, the bridge portion being more flexible than the tip portion.

23. The sealing apparatus of claim 22, wherein each of the fingers is curved in a plane oriented parallel to one of the first and second wall surfaces, and the bridge portion includes at least one slot extending from a position proximate the first wall surface to a position proximate the tip portion.

24. The sealing apparatus of claim 23, wherein the tip portion has a width in the plane ranging from about 0.625 inches to about 1.25 inches, and the bridge portion includes 2 to 4 slots.

25. The sealing apparatus of claim 22, wherein a thickness of the bridge portion is less than a thickness of the tip portion.

26. The sealing apparatus of claim 22, wherein a thickness of the bridge portion is substantially the same as a thickness of the tip portion.

27. The sealing apparatus of claim 20, wherein the second wall surface includes a protruding annular dam, the sealing engagement of each of the members being formed at the dam.

28. The sealing apparatus of claim 22, wherein the tip portion includes a lower surface opposite the upper surface, the lower surface including at least one recess formed therein.

29. The sealing apparatus of claim 28, wherein the recess includes at least one of an open Rayleigh pad, a closed Rayleigh pad, a shrouded Rayleigh pad, a radial groove, and a spiral groove.

30. The sealing apparatus of claim 28, wherein tip portion includes opposite edges, the recess being located between the edges.

31. The sealing apparatus of claim 28, wherein the tip portion includes first and second opposite edges, and the at least one recess includes a first recess positioned along the first edge and a second recess positioned along the second edge.

32. The sealing apparatus of claim 31, wherein the first recess has a width extending in a plane oriented parallel to one of the first and second wall surfaces, and the second recess has a width extending in the plane, the width of the first recess being greater than the width of the second recess.

33. The sealing apparatus of claim 22, wherein the bridge portion includes a first bend in a direction away from the cavity and a second bend in a direction toward the cavity, such that the bridge portion is positioned generally closer to the cavity than the tip portion.

34. The sealing apparatus of claim 20, wherein each of the fingers has opposed edges, the opposed edges being angled with respect to a central axis of the sealing apparatus.

35. The sealing apparatus of claim 20, wherein each of the members includes a first flexible sheet member positioned on the upper surface of one of the fingers and a second sheet member positioned on a top surface of the first sheet member, the first and second sheet members each having a base end coupled to the first wall and a free end positioned within the cavity.

36. The sealing apparatus of claim 35, wherein the first sheet member includes two opposed edges, the two opposed edges being out of alignment with opposed edges of the second sheet member.

37. The sealing apparatus of claim 35, wherein the first sheet member includes two opposed edges, the two opposed edges being out of alignment with opposed edges of each of the fingers.

38. The sealing apparatus of claim 20, wherein each of the members includes an arc shaped bend extending from proximate the upper surface one of the fingers toward a free end of the sheet member, the arc shaped bend having a radius of curvature of less than 90 degrees.

39. The sealing apparatus of claim 22, wherein the tip portion has a curve in a plane oriented parallel to one of the first and second wall surfaces, a radius of the tip portion curve being greater than a radius of a shaft positioned within the annular housing.

40. A compliant sealing apparatus for sealing a high pressure area from a low pressure area, the sealing apparatus comprising:
a housing including:
a base wall,
a first wall extending from the base wall proximate the high pressure area, the first wall having an inner surface,
a second wall extending from the base wall proximate the low pressure area, the second wall having an inner surface, and said base wall, said inner surface of said first wall, and said inner surface of the second wall defining, at least in part, a cavity therebetween;
at least one flexible sheet member extending between the first wall and the second wall, the sheet member including a base end coupled to the first wall and a free end portion positioned within the cavity to form a sealing engagement with the second wall surface and substantially enclose the cavity; and
at least one finger extending from proximate the first wall toward the low pressure area, the finger including a free end located further than the sealing engagement from the first wall inner surface.

41. The sealing apparatus of claim 40, wherein the sheet member is located between the cavity and the finger, and includes two opposed edges, each of the two opposed edges being out of alignment with an edge of the finger.

42. The sealing apparatus of claim 40, wherein the sheet member includes both a first flexible sheet member positioned on the upper surface of the finger and a second flexible sheet member positioned on a top surface of the first sheet member.

43. The sealing apparatus of claim 40, wherein the finger includes a bridge portion coupled to the first wall and a tip portion adjacent the bridge portion, the tip portion having the free end, the bridge portion being more flexible than the tip portion.

44. A compliant sealing apparatus for sealing a high pressure area from a low pressure area, the sealing apparatus comprising:
a housing including:
a base wall,
a first wall extending from the base wall proximate the high pressure area, the first wall having an inner surface,
a second wall extending from the base wall proximate the low pressure area, the second wall having an inner surface, and said base wall, said inner surface of said first wall, and said inner surface of the second wall defining, at least in part, a cavity therebetween;
at least one first flexible sheet member including two opposed edges;
at least one second flexible sheet member located between the first sheet member and the cavity, the second flexible sheet member including two opposed edges being out of alignment with the two opposed edges of the first flexible sheet member,
wherein both the first and second flexible sheet members extend between the first wall and the second wall, and include a base end coupled to the first wall and a free end portion positioned within the cavity to form a sealing engagement with the second wall inner surface; and
at least one finger located along a portion of a lower surface of the first flexible sheet member, the finger extending from proximate the first wall toward the low pressure area.

45. The sealing apparatus of claim 44, wherein the first and second flexible sheet members include an arc shaped bend having a radius of curvature of greater than 90 degrees.

46. The sealing apparatus of claim 44, wherein the finger includes both a bridge portion coupled to the first wall and a tip portion adjacent the bridge portion, the tip portion having a free end located further than the sealing engagement from the first wall inner surface, the bridge portion being more flexible than the tip portion.

47. The sealing apparatus of claim 44, wherein the finger includes two opposed edges, the two opposed edges of the finger being out of alignment with the two opposed edges of the first flexible sheet member.

48. A device having a high pressure area and a low pressure area, the device comprising:
a rotatable shaft; and
a compliant sealing apparatus for sealing the high pressure area from the low pressure area along the rotatable shaft, the sealing apparatus including:
a annular housing including:
a first annular wall positioned proximate the high pressure area,
a second annular wall positioned proximate the low pressure area, said first and second walls positioned adjacent each other with facing inner surfaces of said walls defining, at least in part, a cavity therebetween;
a plurality of fingers spaced from the rotatable shaft, each of the fingers extending from proximate the first wall toward the low pressure area, and including a free end; and a plurality of members, each of the members extending from an upper surface of each the fingers into the cavity to form a sealing engagement with the second wall inner surface, the sealing engagement being located closer than the free end to the first wall inner surface.

49. The device of claim 48, wherein each of the fingers includes a bridge portion coupled to the first wall and a tip portion adjacent the bridge portion, the tip portion having the free end, the bridge portion being more flexible than the tip portion.

50. The device of claim 49, wherein the tip portion is located closer to the rotatable shaft than the bridge portion, and the tip portion is oriented substantially parallel with an outer surface of the rotatable shaft.

51. The device of claim 49, wherein the tip portion has a curve in a plane oriented parallel to one of the first and second wall surfaces, a radius of the tip portion curve being greater than a radius of the rotatable shaft.

52. A compliant sealing apparatus for sealing a high pressure area from a low pressure area, the sealing apparatus comprising:

a housing including:
a base wall,
a first wall extending from the base wall proximate the high pressure area, the first wall having an inner surface,
a second wall extending from the base wall proximate the low pressure area, the second wall having an inner surface, and said base wall, said inner surface of said first wall, and said inner surface of the second wall defining, at least in part, a cavity therebetween;

a first flexible sheet member;

a second flexible sheet member located between the first sheet member and the cavity, wherein both the first and second flexible sheet members extend between the first wall and the second wall, and include a base end coupled to the first wall and a free end portion positioned within the cavity to form a sealing engagement with the second wall inner surface; and a finger located along a portion of a lower surface of the first sheet member, the finger extending from proximate the first wall toward the low pressure area, and including both a flexible bridge portion coupled to the first wall and a tip portion adjacent the bridge portion, the tip portion having a free end located further than the sealing engagement from the first wall inner surface.

* * * * *